May 21, 1935.                H. A. BOYCE                2,002,257
                    SAFETY GUARD FOR SHEARING PRESSES
                    Filed May 11, 1933          2 Sheets-Sheet 2

H. A. Boyce
INVENTOR

By Marks & Clark
ATTYS.

Patented May 21, 1935

2,002,257

UNITED STATES PATENT OFFICE 2,002,257

SAFETY GUARD FOR SHEARING PRESSES

Harold Alan Boyce, London, England, assignor of one-half to Jas. Truscott & Son Limited, London, England Application May 11, 1933, Serial No. 670,563
In Great Britain February 25, 1933

3 Claims. (Cl. 74—615)

This invention has for its object to devise an improved form of safety guard for use upon printers' shearing presses, and other like machines for the purpose of preventing risk of injury to the operator.

Usually such devices operate to stop the machine in the event of the operator's hands being in such position as to be liable to injury but the present invention operates upon an entirely different principle by providing means which will automatically act to push the operator's hands out of the danger zone on the descent or movement of the knife ram or other member liable to cause an accident, the advantage of this arrangement being that while the risk of accident is eliminated or minimized the operation of the machine is not in any way interfered with.

More specifically the invention consists in a safety guard comprising a bar carried upon an arm or arms adapted automatically to be extended consequent upon the movement of the knife or other member so as to push the operator's arms away from the vicinity of said member.

The invention also consists in the construction hereinafter described or indicated.

The accompanying drawings illustrate several modes of carrying out the invention.

In carrying the invention into effect in one convenient manner as, for example, in its application to a printer's shearing press and as illustrated in Figures 1 to 4, there is provided across the front of the knife-holder $a$ a steel or other rigid bar $b$ carried in steel or other slide blocks $c$ fixed to the knife-holder and each end of the bar is secured to or formed as a slide adapted to move up and down in a groove or guide $d$ secured to or formed in suitable parts of the machine frame.

At each end of the bar these is arranged an arm $e$ of lazy-tongs construction, one link $e'$ of each of said arms being movable vertically with the bar while the corresponding link $e^2$ of each arm is suitably anchored.

Figure 1:
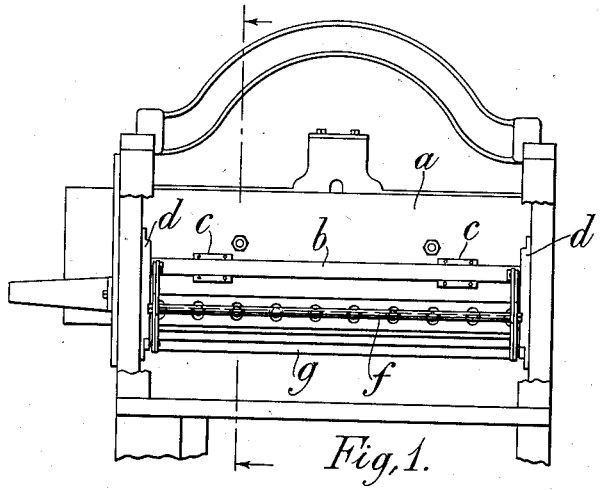
Figure 1 is a front elevation of a part of a shearing press with the invention applied thereto.
Figure 2:
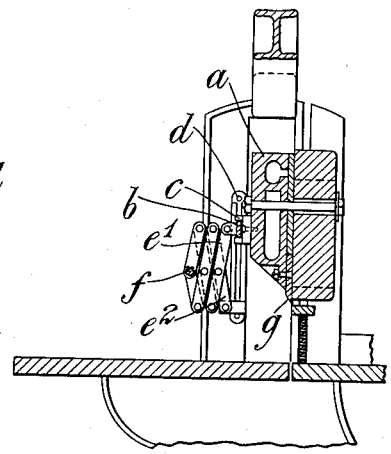
Figure 2 is a side sectional elevation of Figure 1.

The outer ends of the arms $e$ are joined by a steel or other rod $f$ or like member, and the arrangement is such that when the blade $g$ of the shearing press is in its upper position the arms are retracted as shown in Figure 2 so that the operator may readily place the work in the machine in position for the blade to operate upon the work. So soon, however, as the blade begins to descend the arms are automatically extended until they reach the position shown in Figure 4 when the blade is in its lowermost position with the result that the rod or the like $f$ carried by said arms $e$ firmly forces the operator's arms away from the vicinity of the descending knife and thus the risk of injury is obviated.

Figure 3:
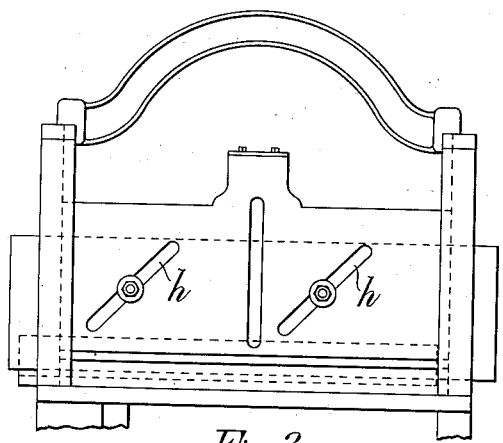
Figure 3 is a rear elevation.
Figure 4:
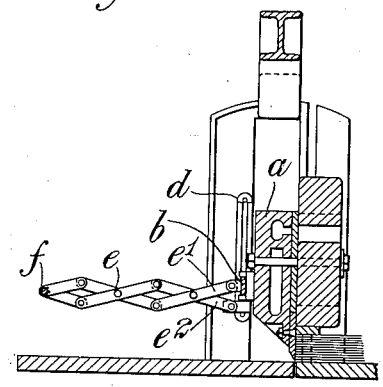
Figure 4 is a similar view to Figure 2 but showing the guard in its operative position.

In Figures 1 to 4 of the drawings the invention is shown as applied to a form of shearing press in which the knife blade is set horizontal and the whole blade carrier moves obliquely downwards, being guide by the slots $h$ (Figure 3). The oblique movement of the slide blocks $c$ moves the bar $b$ vertically since the blocks $c$ may slide along $b$ as the knife is moved obliquely.

Figure 5:
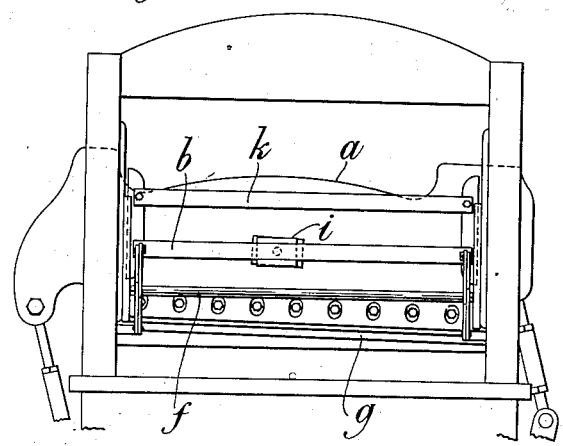
Figure 5 is a front elevation of a further form of shearing press in accordance with the invention.
Figure 6:
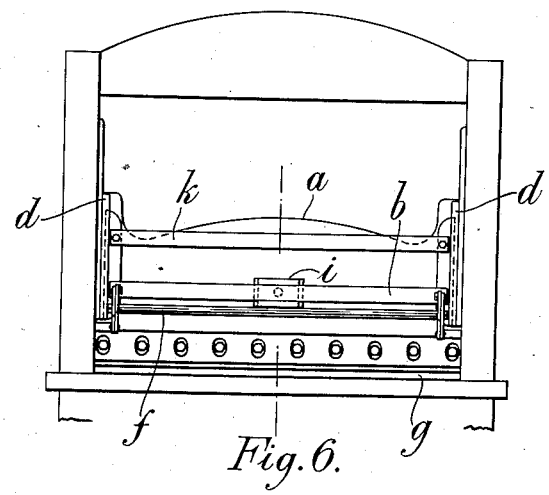
Figure 6 is a similar view to Figure 5 but with the parts in different position.
Figures 7, 8:
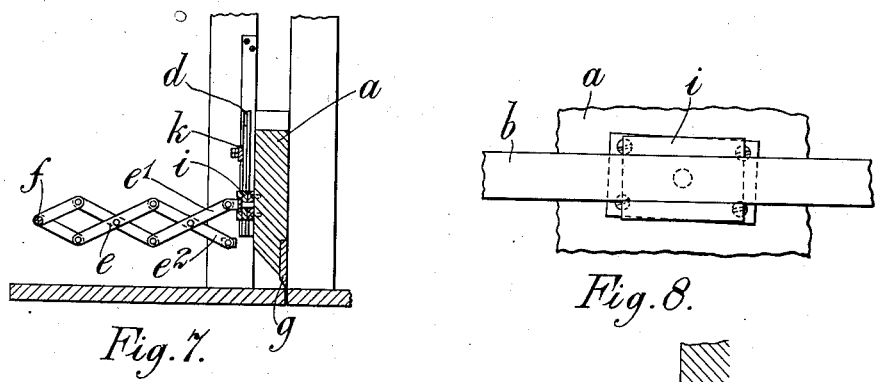
Figure 7 is a side sectional elevation of the machine shown in Figure 5 and with the guard in operative position.
Figures 8 to 11 are views showing details.

Figures 5 to 7 show the invention applied to a form of shearing press in which the blade is set at an inclination to the horizontal and descends substantially vertically. In this case the guard may be of similar construction to the foregoing but in place of the two guide blocks $c$ a single swivelling guide block $i$ is provided to allow for angular movement of the blade during the shearing operation while permitting of the vertical movement of the bar $b$. Further in this or any other modification of the invention the guard may be formed with a second bar $k$ which, with the bar $b$, is connected at each end to the slide member by means of which the extensible arms are operated.

Figures 9, 10:
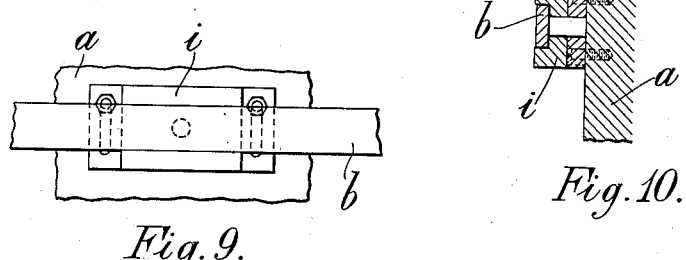
Figure 11:
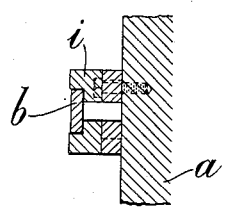

Figure 8 is an enlarged front elevation and Figure 10 is a sectional elevation showing the swivelling block $i$, and Figures 9 and 11 show a modified form of slide or swivelling block that may be used in accordance with the invention and which is slotted so that it may be adjustable in vertical position in order to adjust the position of the guard when necessary to compensate for wear of the knife.

The invention may be applied with equal effect and like advantage to presses and other similar tools, and since the invention consists broadly in the provision of a guard member actuated automatically by the movement of the machine member liable to give rise to injury so as to force the operator's hand away from the vicinity of such member it will be clear that the details of construction may be variously modified without departing from the spirit and scope of the invention. For example the invention is not limited to the lazy-tongs construction as bell cranks or other like devices may be substituted therefor.

Having now described my invention, what I claim as new and desire to secure by Letters Patent is:—

1. A shearing press or like machine having a reciprocable member in combination with a safety guard comprising a rigid guard member extending across the front of the press and substantially parallel to said reciprocable member, a bar operatively connected to said reciprocable member, means for guiding said bar in a straight restricted path and extensible means pivotally connecting each end of the guard member to the corresponding end of the bar and to the frame of the machine.

2. A shearing press or like machine having a reciprocable member in combination with a safety guard comprising a rigid guard member extending across the front of the press and substantially parallel to said reciprocable member, a bar, guide blocks secured to the reciprocable member in which said bar is slidable, a system of diagonal levers pivoted together carrying each end of the guard member and having one lever anchored to the machine frame and another lever pivoted to the bar and guides on the frame receiving the ends of the slidable bar.

3. A shearing press or like machine having a reciprocable member in combination with a safety guard comprising a rigid guard member extending across the front of the press and substantially parallel to said reciprocable member, a bar, a guide block swivelled upon the reciprocable member in which said bar is slidable, a system of pivoted levers carrying each end of the guard member and having one lever anchored to the machine frame and another lever pivoted to the bar and guides on the frame receiving the ends of the slidable bar.

HAROLD ALAN BOYCE